(12) United States Patent
Beswick et al.

(10) Patent No.: US 6,462,616 B1
(45) Date of Patent: *Oct. 8, 2002

(54) EMBEDDED PHONETIC SUPPORT AND TTS PLAY BUTTON IN A CONTACTS DATABASE

(75) Inventors: Antony Paul Beswick, Tustin; Mats Persson, Irvine, both of CA (US)

(73) Assignee: Ericsson Inc., Research Triangle Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,448

(22) Filed: Sep. 24, 1998

(51) Int. Cl.$^7$ ............................ H04M 1/64; G10L 13/00
(52) U.S. Cl. ................................ 329/88.03; 379/88.01; 379/355.01; 704/246; 704/260; 704/270
(58) Field of Search .............................. 379/67.1, 88.01, 379/88.02, 88.03, 69, 76, 201, 206, 93.24, 355.01, 355.02, 355.04; 704/246, 247, 250, 270, 276, 278, 201.01

(56) References Cited

U.S. PATENT DOCUMENTS

| | | | |
|---|---|---|---|
| 5,638,425 A | * 6/1997 | Meador, III et al. | 379/93.15 |
| 5,991,364 A | * 11/1999 | McAllister et al. | 379/88.01 |
| 6,018,568 A | * 1/2000 | Furman et al. | 379/88.01 |
| 6,041,300 A | * 3/2000 | Ittycheriah et al. | 704/255 |
| 6,049,594 A | * 4/2000 | Furman et al. | 379/67.1 |
| 6,163,596 A | * 12/2000 | Gelfer et al. | 379/67.1 |
| 6,167,117 A | * 12/2000 | Will | 379/88.03 |
| 6,173,266 B1 | * 1/2001 | Marx et al. | 704/270 |

FOREIGN PATENT DOCUMENTS

| | | |
|---|---|---|
| EP | 0 848 530 A2 | 12/1997 |
| EP | 0 829 993 A2 | 3/1998 |
| WO | WO 97/19545 | 5/1997 |
| WO | WO 98/13992 | 4/1998 |
| WO | WO 98/45834 | 10/1998 |

OTHER PUBLICATIONS

Retrieved from Internet: http://tisch.bx.net/dragon/news/pressrelease/news-speechtool.html "Dragon Speech Tool 1.0 Builds Custom Speaker-Independent Vocabularies for Speech Recognition," Jul. 9, 1998.

Billi et al, "Interactive Voice Technology At Work: The CSELT Experience," Speech Communication, NL, Elsevier Science Publishers, Amsterdam, vol. 17, No. 3, pp. 263–271.

* cited by examiner

Primary Examiner—Fan Tsang
Assistant Examiner—Ovidio Escalante
(74) Attorney, Agent, or Firm—Jenkens & Gilchrist, P.C.

(57) ABSTRACT

Improved methods and arrangements are provided for use in a computer telephony system that supports dial by name operations. A multiple purpose contacts database is modified through a graphical user interface (GUI) to include corresponding phonetically spelled information and/or other alias information for a contact. Voice recognition capabilities in the computer telephony system, which support the dial by name operations, can be directly invoked through the GUI to playback the phonetically spelled information and/or other alias information.

34 Claims, 5 Drawing Sheets

US 6,462,616 B1

EMBEDDED PHONETIC SUPPORT AND TTS PLAY BUTTON IN A CONTACTS DATABASE

BACKGROUND OF THE INVENTION

1. Technical Field of the Invention

The present invention relates to computer telephony systems, and more particularly, to methods and arrangements that allow a computer telephony system to utilize a contacts database for voice recognition supported automated dialing.

2. Description of Related Art

Computer telephony systems are becoming increasingly popular because they provide specific services, which in the past would have been cost prohibitive if provided by traditional telephone systems. Essentially, computer telephony system includes technologies that actively integrate computers and like devices to function as would a traditional telephone system and/or private branch exchange (PBX), but only on a smaller scale and/or at a significantly lower cost. While a computer telephony system can be a stand alone communication system, for example within a home or small business environment, it is more likely to also be connected to existing telecommunications systems, such as a public switched network (PTSN), and/or other data networks, such as a local area network (LAN). As such, most computer telephony systems are configured to provide users with several communication related features. Indeed, the inherent flexibility of a programmable computer telephony system allows for specialized and/or customized communication features to be provided, often with only a modest attendant increase in cost.

Of particular interest within computer telephony systems is the increased demand from users to integrate new and different types of devices and the need to support the portability of these devices. The increase in demand for mobile cellular radio telephones, personal digital assistants (PDAs), pagers, e-mail services, and facsimile services are prime examples of the changing requirements that users present, even in a small home and/or small business environment.

The resources available within a computer telephony system are uniquely positioned to meet the future needs of these service-rich users. To support these and other types of needs, however, there is a need to make the computer telephony system's resources easier to access and use, especially for mobile users.

One promising way to make a computer telephony system easier to access and use is to include voice recognition capabilities within the computer telephony system that allow users to access certain features or even place calls by voice commands rather than by responding to prompts for numerical entries and/or otherwise entering the telephone number/extension for a party.

Configuring a computer telephony system to accurately support voice commands, such as, for example, a dial by name voice command, can be difficult. A typical name dialing computer telephony system employs a dedicated, often proprietary database that includes entries for each of the user's names and telephone/extension numbers. These entries can be either manually entered into the database, or in certain systems spoken into the system and processed by an automatic speech recognition (ASR) engine, which generates a phoneme image that is then stored in the database.

When prompted, for example, during subsequent operation, a typical computer telephony system having dial by name capabilities will attempt to match received speech samples to the entries using phonemes. When there is a match, then the caller will typically be asked to verify that the match was correct. This verification process typically includes using a text-to-speech (TTS) engine to playback the name of the matched entry in the database. Once the match has been verified, the call is placed.

One of the drawbacks to these types of computer telephony systems is that they require a special database. Thus, the user is typically required to populate the database and to actively update and/or maintain the database. Establishing and maintaining this computer telephony database can be a burden to users who also utilize and maintain a separate, typically more general purpose contacts database.

For example, a contacts database can be generated through organizing, planning, and or scheduling software programs. A contacts database, therefore, usually includes additional information beyond simply a contact's name and telephone number. By way of example, a contacts database can include street and e-mail addresses, relevant dates, related contacts, job titles, company name, fax number, favorite pub, and/or other miscellaneous notes and related information.

As can be appreciated, it would be advantageous for the computer telephony system to access the information in the contacts database directly, rather than requiring a separate database. Providing such a capability, however, can be a challenge due to the limitations in existing voice recognition software and the size/complexity of a typical contacts database. For example, there is a significant possibility that the accurate spelling of names that is required in a contacts database will not be recognizable to the automatic speech recognition (ASR) and text-to-speech (TTS) engines within the computer telephony system.

As such, users would need to either learn to pronounce names as the ASR/TTS engines do, or modify the spelling of the name in the database to essentially trick the ASR/TTS engines to select the name close to proper pronunciation. This iterative learning process would require that the user switch back and forth from accessing the dial by name feature to hear the interpretation, to modifying the contacts database in an attempt to correct the interpretation.

These types of solutions can be overly burdensome on the users, not only during initial set-up and maintenance, but also during continued operation. This is especially true for systems that require users to learn how to pronounce the names as the ASR/TTS engines do. These problems are only increased if the system is installed to support a large number of users, and/or users with diverse language based names.

Moreover, in those systems that require trick spelling of names, the integrity of the contacts database can be reduced, and/or the contacts database can be more difficult manage.

Thus, there is a need for improved methods and arrangements that allow a computer telephony system having dial by voice capabilities to access and utilize a contacts database.

SUMMARY OF THE INVENTION

The present invention provides improved methods and arrangements for use in a communications system, such as a computer telephony system having dial by voice capabilities, that allows users to place calls to contacts provided in a multiple purpose contacts database.

In accordance with certain aspects of the present invention, the improved methods and arrangements provide tools that allow a user to add one or more extensions to a contacts database for use by the voice recognition capabilities in a computer telephony system.

In accordance with certain further aspects of the present invention, the improved methods and arrangements allow users to directly playback one or more fields in the contacts database using the voice recognition capabilities of the computer telephony system.

Thus, for example, a contacts database can be configured for use by a computer telephony system by providing an image of at least a portion of the data in the contacts database, such as, a correctly spelled name field and corresponding telephone number for a given contact. This image of the contacts database, or a portion thereof, can be displayed to the user, for example, through a graphical user interface (GUI) in the computer telephony system. The user can then designate one or more contacts as being accessible through the voice recognition capabilities in the telephony system, for example, to support subsequent dial by name functionality.

In addition to the existing correctly spelled name field in the contacts database, the user can also add at least one phonetic pronunciation field to the contacts database, for example, for names that are difficult for the voice recognition capabilities to match. During subsequent operation, the voice recognition capabilities in the computer telephony system can access and/or evaluate the phonetic pronunciation field when necessary.

The user can also add at least one alias field to the contacts database that can also be accessed and/or evaluated by the voice recognition capabilities in the computer telephony system.

The user is also provided with the capability to initiate playback (for example, through a speaker connected within the computer telephony system) of either of these additional fields and/or the correctly spelled name field in the contacts database. Thus, for example, the data in these fields or a portion thereof can be directly provided to or otherwise directly accessed by the ASR/TTS engines within the computer telephony system and played for the user.

In accordance with certain further aspects of the present invention, the various improved methods and arrangements allow a computer telephony system to utilize a contacts database or a portion thereof for supporting dial by name functionality.

The contacts database can be a multiple purpose contacts database that is generated by a separate application and maintained through other computing resources. For example, the contacts database can include data stored with Messaging Application Programming Interface (MAPI), Open DataBase Connectivity (ODBC), Structured Query Language (SQL), comma separated values (CSV) or other similar formats, for example, using a separate software application. Further, the contacts database can be maintained on a separate (networked) personal computer (PC).

BRIEF DESCRIPTION OF THE DRAWINGS

A more complete understanding of the methods and arrangements in accordance with certain embodiments of the present invention may be had by reference to the following detailed description when taken in conjunction with the accompanying drawings wherein.

DETAILED DESCRIPTION OF THE PRESENTLY PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
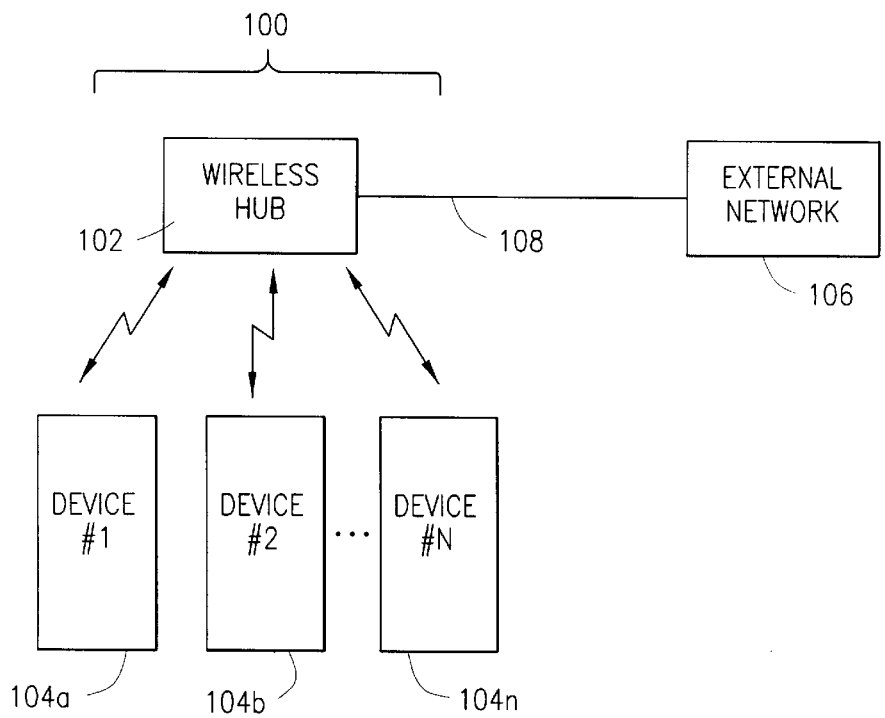
FIG. 1 is a block diagram depicting a telephony arrangement having a wireless hub arrangement that is arranged to provide telephony functions, in accordance with certain embodiments of the present invention.

FIG. 1 is a block diagram depicting a computer telephony system 100 that is arranged to provide voice and/or data communications to a plurality of local users. In order to accomplish this task, computer telephony system 100 includes a hub 102 that is arranged to provide telephony functions to a plurality of users through devices 104a–n. As depicted, hub 102 is depicted as providing wireless communications to a plurality of users, through devices 104a–n Although not shown, hub 102 can also be arranged to support wired communications to other devices.

As depicted, hub 102 is connected to at least one external network 106 through one or more wire or fiber lines 108. In other embodiments, lines 108 can also include wireless connections. In this manner, computer telephony system 100 is configured to provide telephony services through one or more telecommunications networks. Hub 102, therefore, provides the signal interfacing, switching, monitoring, and controlling functions as required to support the various telephony services, features and operations.

By way of example, in accordance with certain embodiments of the present invention, external network 106 can be any type of communications network that is arranged to provide communications with remote users and/or devices, such as, a public switched telephone network (PTSN). Additionally, external network 106 in certain further embodiments includes or otherwise provides an interface to other external network resources such as an intranet and/or the Internet.

Devices 104a–n can include any type of communication device that is configured for accessing a computer telephony system. By way of example, device 104a can be a wireless telephone or pager type of device, device 104b can be a modem-configured computing device such as a portable computer or personal digital assistant type of device. Devices 104a–n are typically configured to transmit and receive (i.e., exchange) information in the form of either analog or digital data through hub 104, lines 108 and the various resources provided by external network 106.

Figure 2:
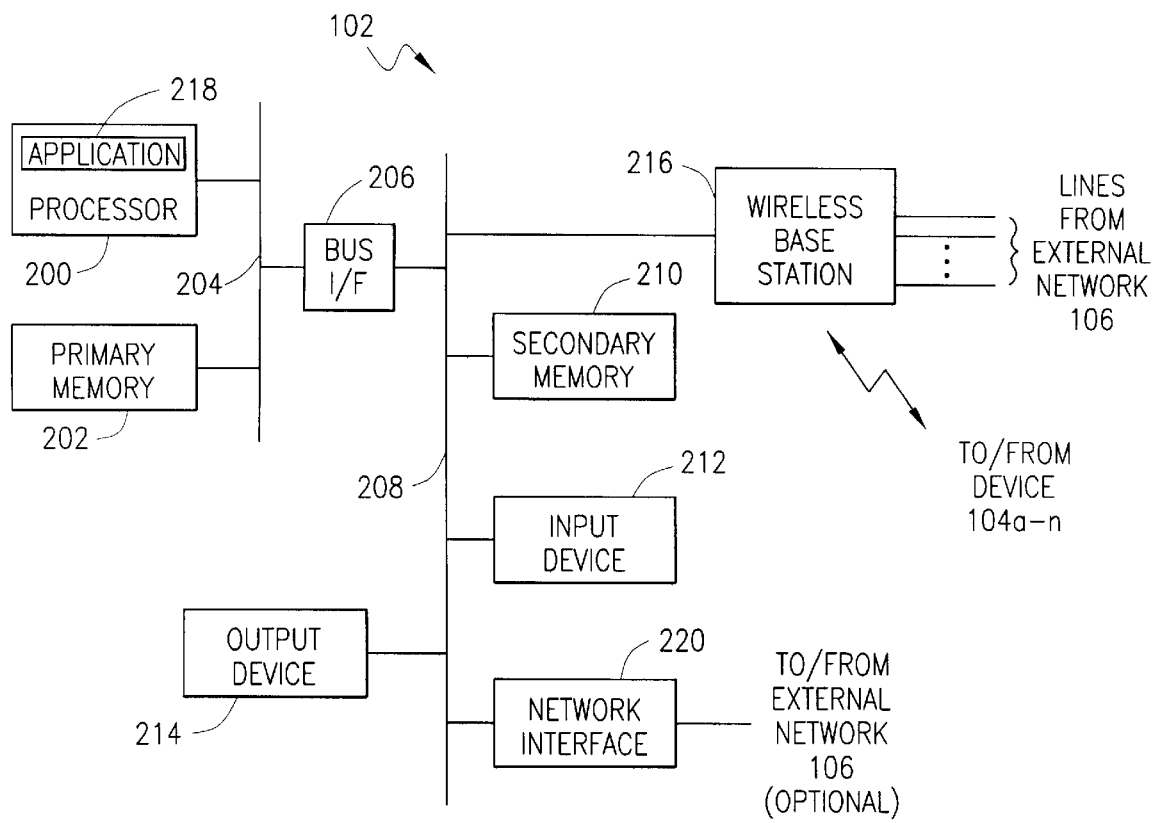
FIG. 2 is a block diagram depicting an exemplary wireless hub arrangement, as in FIG. 1, having a computer system configured to run a telephony application, a base station device, and at least one user device, in accordance with certain embodiments of the present invention.

FIG. 2 is a block diagram depicting an exemplary hub 102 that is based primarily on a computer architecture, such as, for example, that found in a contemporary personal computer (PC) or like computer system. Indeed, in accordance with certain preferred embodiments of the present invention, hub 102 includes a conventional PC that is connected to a base station 216 and configured to run one or more telephony applications, including, for example, a telephony application that supports dial by name services.

Referring to the exemplary embodiment depicted in FIG. 2, within hub 102 there is at least one processor 200 that is connected to a primary memory 202 through a first bus 204. Processor 200, for example, can be a microprocessor, such as a Pentium II microprocessor available from Intel Corporation of Santa Clara, California. Processor 200 is configured to access primary memory 202 through first bus 204. Primary memory 202 includes random access memory (RAM), such as, dynamic random access memory (DRAM), which is configured to store data associated with at least one telephony application 218 that runs in processor 200.

As shown in FIG. 2, first bus 204 is further interfaced to a second bus 208, through a bus interface (I/F) 206. By way of example, second bus 208 can be a Universal Serial Bus (USB), a Peripheral Component Interconnect (PCI) bus, an Industry Standard Architecture(ISA)bus, or other similar bus.

A plurality of devices can be connected to second bus 208. For example, as depicted, a secondary memory 210 can be connected to second bus 208 to provide additional data storage. Secondary memory 210 can include, for example, additional RAM, DRAM, static random access memory (SRAM) (e.g., flash memory), a disk or tape drive and associated magnetic or optomagnetic storage medium, an optical storage drive and optical storage medium, or other like storage device.

At least one input device 212 is also connected to second bus 208 and configured to accept inputs from an operator. Input device 212 can include, for example, a keyboard device, a mouse device, a trackball device, a pen device, a pointing device, a touch sensitive input device, a microphone device, or other like input device. The inputs from input device 212 are then provided to processor 200, application 218, or any of the other applicable connected devices in FIGS. 1 and 2.

At least one output device 214 is also connected to second bus 208. Output device 214 is configured to generate an output suitable for use by a user (with or without additional devices) in response to one or more signals from processor 200. By way of example, output device 214 can include a cathode-ray tube (CRT) generated display, flat panel display, a printer, an audio monitor, or other like devices. In accordance with certain preferred embodiments of the present invention, output device 214 includes a display device such as a CRT or flat panel display.

Hub 102 also includes a base station 216 that is configured to support telephony operations within computer telephony system 100. As shown, base station 216 is connected to second bus 208. Base station 216 includes, for example, a switch matrix and associated processing and/or interface circuitry (not shown). In a wireless hub arrangement 100, such as that depicted in FIG. 1, control device 216 also includes transceiver circuitry that supports the wireless communications to/from devices 104a–n. Base station 216 also provides an interface to lines 108.

Base station 216 is configured to exchange information and to respond to one or more commands from application 218 to selectively control the switch matrix as required to support various telephony operations. To accomplish this, base station 216 is configured to provide status information about the telephony operations, e.g., information about a call, and status information about or from the various devices 104a–n An optional network interface device 220 is also connected to second bus 208 to provide additional non-telephony communications between processor 200, for example, a local area network (LAN) (not shown).

Although second bus 208 is depicted as connecting several different devices to first bus 204 and processor 200, it is to be understood that this is only an exemplary configuration, and that certain additional embodiments in accordance with the present invention use a plurality of buses, direct interfaces, and/or shared interfaces between the various devices.

Further, it is to be understood that additional devices can be connected to or otherwise provided in hub 102 as needed to support wired or wireless communications and/or other networking capabilities.

Figure 3:
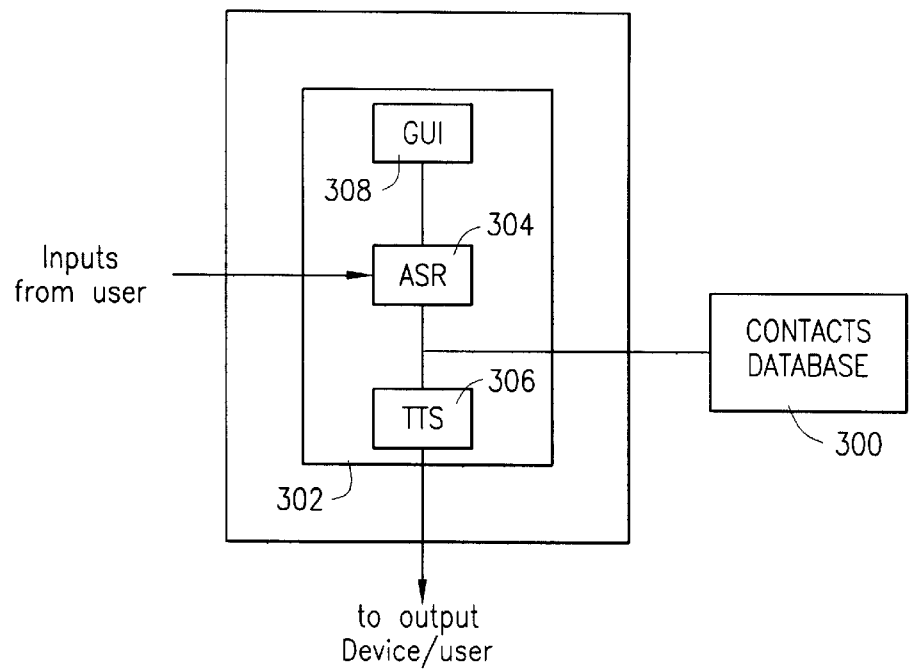
FIG. 3 is a functional block diagram depicting a telephony application, as in FIG. 2, having a user interface that includes an ASR engine and a TTS engine, and a contacts database, in accordance with certain embodiments of the present invention.

FIG. 3 depicts relevant portions of an exemplary telephony application 218 that is configured to operate substantially within processor 200. Application 218 is configured to access a contacts database 300, for example through a user interface 302. Contacts database 300 can be co-located within hub 102 or can be located in other computing resources that are connected or otherwise accessible to hub 102 and application 218.

User interface 302 includes an automatic speech recognition (ASR) engine 304, a text-to-speech (TTS) engine 306 and a graphical user interface 308. During normal telephony operations, ASR 304 is configured to receive user voice inputs, for example, from devices 104 (via base sation 216, etc.). The user voice inputs are then interpreted (e.g., sampled, analyzed, processed, and/or compared) using at least a portion of the data in contacts database 300.

For example, a user can request by voice to be connected to another user by speaking the called party's name into device number 1 (104a ). The resulting user voice input is then provided to ASR 304. ASR 304 examines certain entries 402 (e.g., flagged entries) within contacts database 300 to determine the extension number or telephone number for the called party. Once a candidate entry has been found by ASR 304 (i.e., a match has been found), then the TTS engine 306 is used to convert at least one related field to an output that can be played for the user, for example, through the device number 1 (104a). The user can then accept the interpretation or reject the interpretation. If accepted, then the call is placed.

To support this type of dial by name capability, the contacts database needs to be configured for access by ASR 304 and/or TTS 306. This is accomplished, in accordance with certain embodiments of the present invention, through GUI 308. However, before describing GUI 308 and the process by which the user can modify data in contacts database 300 to support dial by name capabilities, it is useful to know how the data in contacts database 300 is used by application 218 to support dial by name capabilities.

Figure 4:
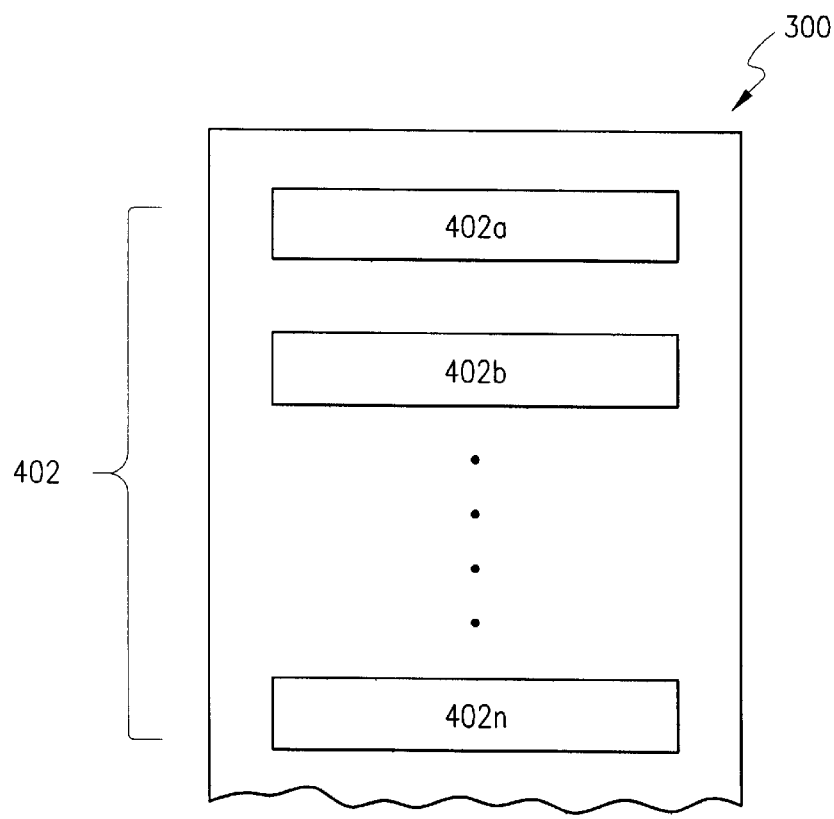
FIG. 4 graphically depicts a contacts database having a plurality of entries, as in FIG. 3, in accordance with certain embodiments of the present invention.

With this in mind, FIG. 4 graphically depicts an exemplary contacts database 300, having a plurality of entries 402a–n. Each entry 402 is related to at least one contact. A contact is typically a person or business, but may also represent a group of people and/or businesses.

Figure 5:
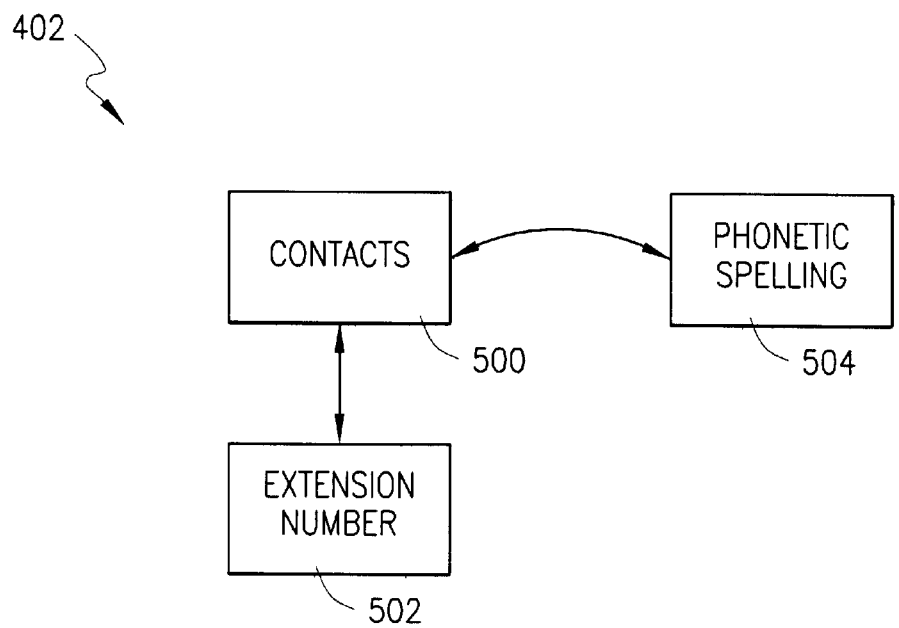
FIG. 5 graphically depicts an exemplary entry, as in FIG. 4, and the linking functionality between various fields, including a phonetically spelled field, associated with the entry, in accordance with certain embodiments of the present invention.

As shown in FIG. 5, logically associated with each entry 402 in contacts database 300, are a plurality of fields, including a contact field 500, a telephone number field 502 and a phonetic spelling field 504. Contact field 500 includes the correct spelling of the contact. Telephone number field 502 and phonetic spelling field 504 are logically linked, mapped or otherwise tied with contact field 500. Thus, when ASR 304 accesses contacts database 300 and locates an interpreted contact field 500, either the telephone number field 502 and/or phonetic spelling field 504 can also be determined and accessed.

Telephone number field 502 includes at least one identifier that can be used to complete the call, such as, for example, an extension number or telephone number.

Phonetic spelling field 504 is configured to allow entry of a phonetic spelling of at least a portion of the information in the associated contact field 500. By way of example, a contact 500 for a person with the name of "Kjell Johansson" might be phonetically spelled as "Shell Yohanson" within phonetic spelling field 504.

Figure 6:
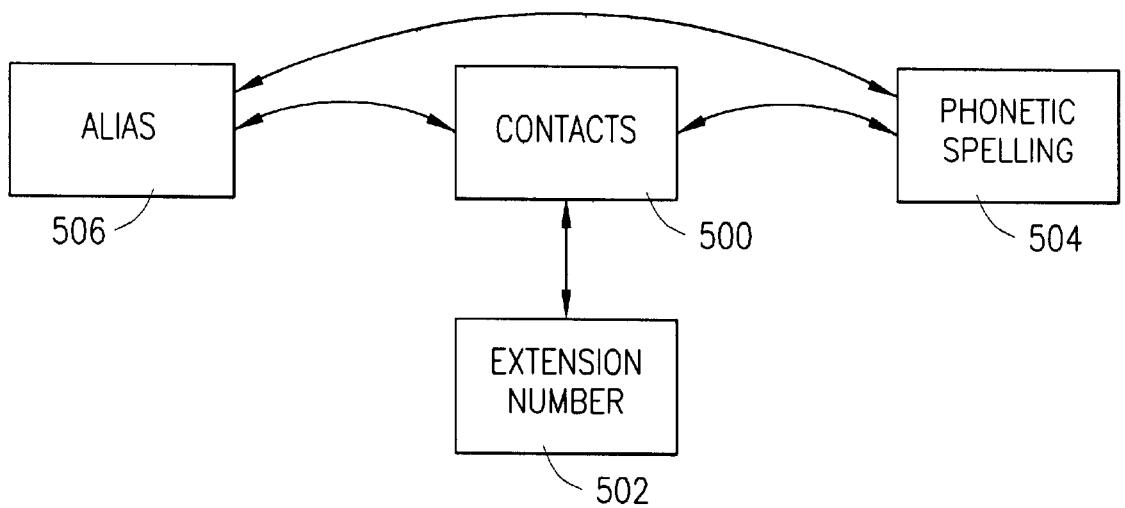
FIG. 6 graphically depicts an exemplary entry, as in FIG. 5, and the linking functionality between various fields, including an alias field, associated with the entry, in accordance with certain further embodiments of the present invention.

FIG. 6 depicts an enhanced version of a contacts database, as depicted in FIGS. 4 and 5. The enhancement includes the addition of at least one alias field 506. Alias field 506 is similar to the phonetically spelled field 504 in that it is also linked to contact field 500 and is accessed by ASR 304 and/or TTS 306. Within alias field 506 is an alias word or phrase, for example, that can be used during the interpretation of the voice input from the user.

By way of example, the user might input "I need a doctor". This phrase or portions thereof can be entered into alias field 506, for example, during set-up, for a contact by the name of "Dr. Smith". As such, application 218 can be configured to analyze all, or a portion of, the voice command and interpret the command as requesting Dr. Smith.

Figure 7:
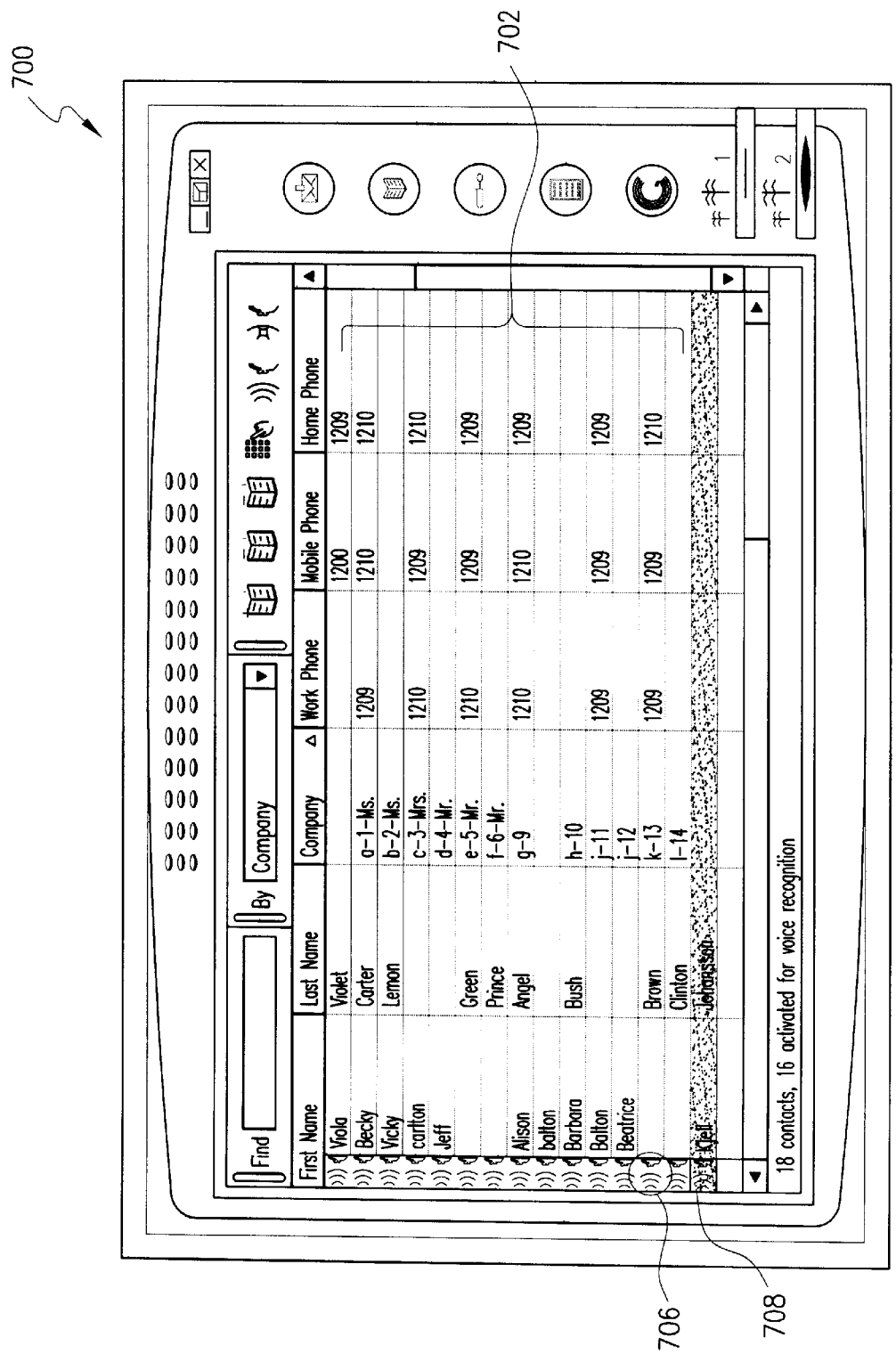
FIG. 7 depicts an exemplary display generated by a graphical user interface (GUI) within the computer telephony system, the display includes an image of a portion of a contacts database, in accordance with certain embodiments of the present invention.

Referring now to FIG. 7, an exemplary display 700 as generated by GUI 308 is depicted. Contacts database 300, or a portion of the data therein, can be viewed and manipulated by the user through GUI 308, input device 212 and output device 214.

Display 700 includes an image 702 of a portion of a contacts database, in accordance with certain embodiments of the present invention. As shown, within image 702, there are plurality of contacts, each having names and associated extension numbers provided. The user can modify the information in these various fields by selecting a field and entering new information. From display 700, the user can also determine if a particular contact has been flagged or otherwise identified to be accessed by the computer telephony system's voice recognition capabilities. For example, a marker 706 is displayed that identifies that the contact, named "Beatrice" is activated for voice recognition. Additionally, GUI 308 is configured to allow selection of a contact, such as, the highlighted contact 708, named "Kjell Johansson". By double clicking on contact 708, for example, using a mouse input device 212, the user opens an additional editor 802, as depicted in FIG. 8.

Figure 8:
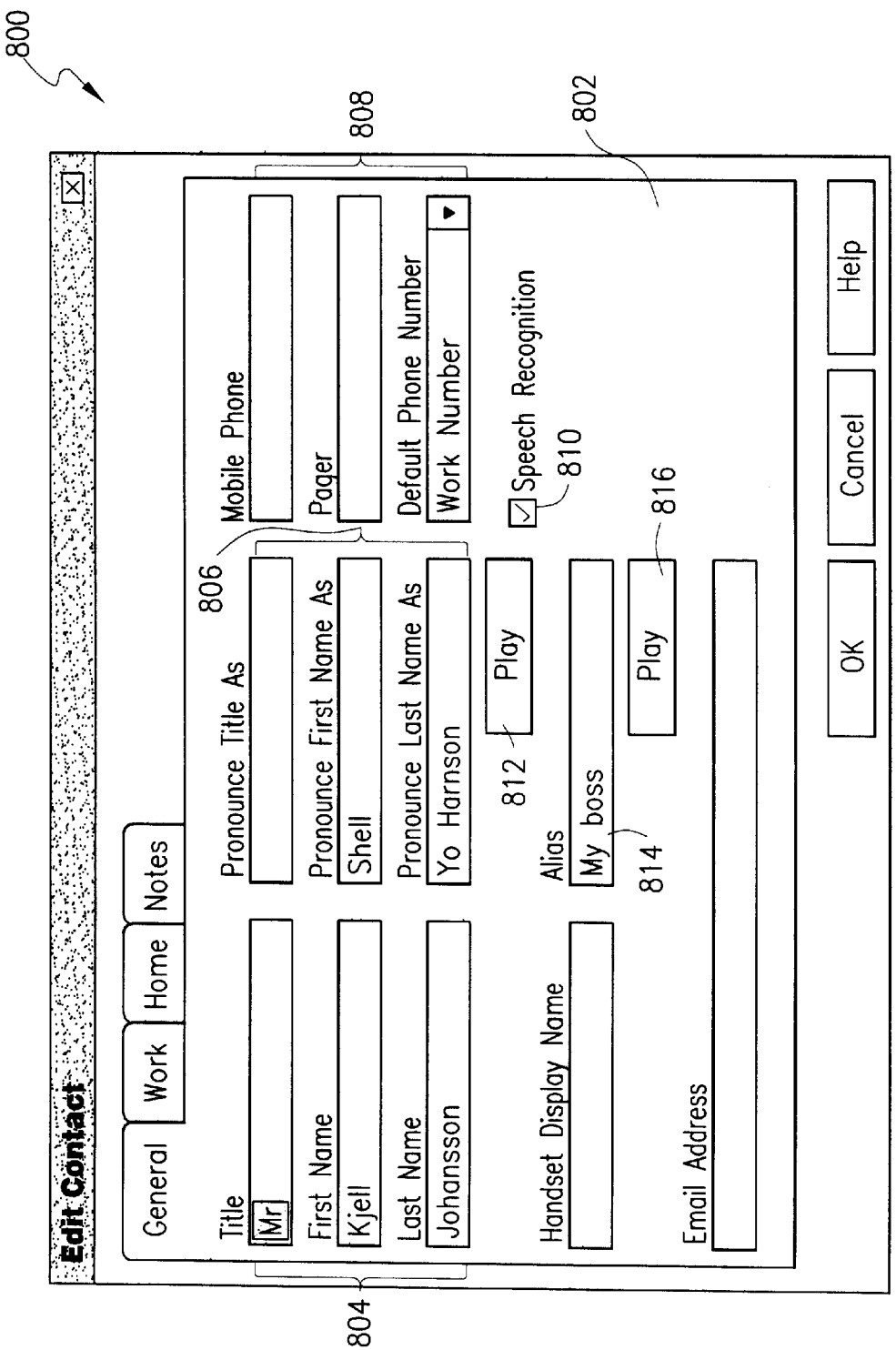
FIG. 8 depicts an exemplary display generated by a graphical user interface (GUI) within the computer telephony system, the display includes an editor for entering correctly spelled names of contacts, and/or an associated pronunciation or alias, and a play button for playing back an entry, in accordance with certain embodiments of the present invention.

FIG. 8 depicts an exemplary display 800 generated by GUI 308 having an editor 802. Editor 802 allows the user to modify information associated with a contact, including the contacts title/name 804 and corresponding "pronounce as" information 806. Title/name information 804 is from contact field 500 and the "pronounce as" information is from phonetic spelling field 505. Further, the user can modify telephone number information 808, which is from telephone number field 502. The user can also enter alias information 814, which corresponds to alias field 506 in contacts database 300.

As depicted, editor 802 and GUI 308 allow the user to activate a contact for voice recognition using check box 810. When check box 810 is activated (i.e., as shown), application 218 adds a data extension 404 to the associated entry 402 in contacts database 300 that identifies the entry 402 as being accessible by application 218 for voice recognition. For example, data extension 404 can be flag that is easily located by application 218.

Play button 812 is provided in editor 802 to allow the user to selectively hear a playback of either the title/name information 804 or "pronounce as" information 806. The default mode is to play the title/name information 804 if the "pronounce as" information 806 is not provided (i.e., left blank). If "pronounce as" information 806 has been provided, then it will be played back when play button 812 is selected. For example, when the user activates play button 812, application 218 uses TTS 306 to convert the text in "pronounce as" information 806 to an audio output that is provided to output device 214 (e.g., an audio monitor or speaker) where a corresponding voice (sound) is produced.

In this manner, the user is able to quickly determine if the "pronounce as" information 806 and resulting field 504 is satisfactory, without having to access the normal dial by number operations of computer telephony system using a device 104.

A second play button 816 is also provided to allow for a similar direct playback of alias information 814.

Referring back to FIG. 4, application 218 is configured to add the additional information as described above to the applicable entries 402 in contacts database 300. For example one or more data extensions 404 can be added to an entry 402. A data extension 404 can include, for example, flags and/or text strings, etc.

As will be recognized by those skilled in the art, the innovative concepts described in the present application can be modified and varied over a wide range of applications. For example, additional different phonetic spelling fields can be included within contacts database 300 to account for different user inflections and/or accents. Furthermore, the various arrangements and methods are not limited to small computer telephony systems, but can easily be adapted for use in other communication systems, including larger systems, such as, PBXs, and portions of telephone system. Accordingly, the scope of patented subject matter should not be limited to any of the specific exemplary teachings discussed.

What is claimed is:

1. An arrangement comprising:

a processor;

at least one user device configured to provide audible user inputs to the processor and audible outputs from the processor to a user;

a multiple purpose contacts database comprising a first field having at least one substantially correctly spelled contact identifier, a corresponding second field having at least one phonetic spelling of the contact identifier in the first field, an extension number field that corresponds to at least one of the first and second fields, an alias field that corresponds to at least one of the first and second fields and a data extension field, the data extension field indicative of whether the contact identifier is voice accessible;

a voice recognizer configured at least partially within the processor to directly access the first and second fields in the multiple purpose contacts database to interpret the audible user inputs only if the data extension field indicates that the contact identifier is voice accessible; and the processor operating to allow a user to manually select the phonetic spelling of the contact identifier.

2. The arrangement as recited in claim 1, wherein the voice recognizer further comprises an automatic speech recognition (ASR) engine that is configured to analyze the audible user inputs and in response to access at least one of the first and second fields in the multiple purpose contacts database.

3. The arrangement as recited in claim 1, wherein the voice recognizer further comprises a text-to-speech (TTS) engine that is configured to generate speech outputs suitable for outputting to the user from at least one of the first and second fields in the multiple purpose contacts database.

4. The arrangement as recited in claim 1, wherein the voice recognizer further comprises an automatic speech recognition (ASR) engine that is configured to analyze the audible user inputs and match the audible user inputs to at least one of the first field, the second field, and the alias field to facilitate the placing of a call to a contact associated with the contact identifier.

5. An apparatus for use in a computer system having a processor, and at least one user device configured to provide audible user inputs to the processor and audible outputs from the processor to a user, the apparatus comprising:

a multiple purpose contacts database having a first field that includes at least one substantially correctly spelled contact identifier, a corresponding second field that includes at least one phonetic spelling of the contact identifier in the first field, an extension number field that corresponds to at least one of the first and second fields, an alias field that corresponds to at least one of the first and second fields and a data extension field, the data extension field indicative of whether the contact identifier is voice accessible;

a voice recognizer configured at least partially within the processor to directly access the first and second fields in the multiple purpose contacts database to interpret audible user inputs only if the data extension field indicates that the contact identifier is voice accessible; and the processor operating to allow a user to manually select the phonetic spelling of the contact identifier.

6. The apparatus as recited in claim 5, wherein the voice recognizer further comprises an automatic speech recognition (ASR) engine that is configured to analyze the audible user inputs and in response to access at least one of the first and second fields in the multiple purpose contacts database.

7. The apparatus as recited in claim 5, wherein the voice recognizer further comprises a text-to-speech (TTS) engine that is configured to generate speech outputs suitable for outputting to the user from at least one of the first and second fields in the multiple purpose contacts database.

8. The apparatus as recited in claim 5, wherein the voice recognizer further comprises an automatic speech recognition (ASR) engine that is configured to analyze the audible user inputs and match the audible user inputs to at least one of the first field, the second field, and the alias field to facilitate the placing of a call to a contact associated with the contact identifier.

9. A computer readable medium for use with a computer system having a processor, and at least one user device configured to provide audible user inputs to the processor and audible outputs from the processor to a user, the computer readable medium comprising computer instructions that:

establish a multiple purpose contacts database having a first field that includes at least one substantially correctly spelled contact identifier, a corresponding second field that includes at least one phonetic spelling of the contact identifier in the first field, an extension number field that corresponds to at least one of the first and second fields, an alias field that corresponds to at least one of the first and second fields and a data extension field, the data extension field indicative of whether the contact identifier is voice accessible;

provide a voice recognizer that directly accesses the first and second fields in the multiple purpose contacts database to interpret audible user inputs only if the data extension field indicates that the contact identifier is voice accessible; and allow a user to manually select the phonetic spelling of the contact identifier.

10. The computer readable medium as recited in claim 9, wherein the voice recognizer further comprises an automatic speech recognition (ASR) engine that is configured to analyze the audible user inputs and in response to access at least one of the first and second fields in the multiple purpose contacts database.

11. The computer readable medium as recited in claim 9, wherein the voice recognizer further comprises a text-to-speech (TTS) engine that is configured generate speech outputs suitable for outputting to the user from at least one of the first and second fields in the multiple purpose contacts database.

12. The computer readable medium as recited in claim 9, wherein the voice recognizer is configured to analyze the audible user inputs and match the audible user inputs to at least one of the first field, the second field, and the alias field to facilitate the placing of a call to a contact associated with the contact identifier.

13. A method for supporting name dialing in a communications system, the method comprising:

receiving user voice inputs;

in response to the user voice inputs, directly accessing a multiple purpose contacts database having a first field that includes at least one substantially correctly spelled contact identifier, a corresponding second field that includes at least one phonetic spelling of the contact identifier in the first field to interpret the user voice inputs, an extension number field that corresponds to at least one of the first and second fields, an alias field that corresponds to at least one of the first and second fields, and a data extension field, the data extension field indicative of whether the contact identifier is voice accessible, wherein the first and second fields of the multiple purpose contacts database are accessible in response to the user voice inputs only if the data extension field indicates that the contact identifier is voice accessible; and allowing a user to manually select the phonetic spelling of the contact identifier.

14. The method as recited in claim 13, further comprising analyzing the user voice inputs using an automatic speech recognition (ASR) engine.

15. The method as recited in claim 13, further comprising using a text-to-speech (TTS) engine to generate speech outputs suitable for outputting to the user from at least one of the first and second fields in the multiple purpose contacts database.

16. The method as recited in claim 13, further comprising analyzing the audible user inputs and matching the audible user inputs to at least one of the first field, the second field, and the alias field to facilitate the placing of a call to a contact associated with the contact identifier.

17. An editor for use with a multiple purpose contacts database in a computer having at least one input device and at least one output device, the editor comprising:

a graphical user interface (GUI) arranged to display at least a portion of the multiple purpose contacts database having a first field including a correctly spelled identifier of at least one contact, a corresponding second field including a phonetically spelled identifier associated with the at least one contact, an extension number field that corresponds to at least one of the first and second fields, an alias field that corresponds to at least one of the first and second fields, and a data extension field indicative of whether the contact identifier is accessible by a voice recognizer, the GUI configured to allow a user to manually edit the phonetically spelled identifier, and further configured to allow a user to manually select the data extension field to indicate whether the contact identifier is accessible by the voice recognizer;

a selector, within the GUI; and a text-to-speech (TTS) engine responsive to activation of the selector in the GUI that causes at least the phonetically spelled identifier to be output as sound through an output device.

18. The editor as recited in claim 17, wherein the GUI is further configured to support a computer telephony system by providing access to at least a portion of the multiple purpose contacts database.

19. The editor as recited in claim 18, wherein the TTS engine is within the computer telephony system and further configured to support voice recognition within the computer telephony system such that when the selector is activated the TTS engine, in response, is invoked without requiring user voice inputs.

20. The editor as recited in claim 17, wherein the GUI is further configured to display and allow a user to manually edit the extension number field that corresponds to the correctly spelled identifier.

21. The editor as recited in claim 17, wherein the GUI is further configured to display and allow a user to manually edit the alias field that corresponds to the correctly spelled identifier.

22. The editor as recited in claim 17, wherein the GUI is further configured to allow the text-to-speech (TTS) engine to cause at least one of the correctly spelled identifier, the phonetically spelled identifier, and the alias field to be output as sound through the output device.

23. An apparatus for use in a computer system having a processor, and at least one user device configured to provide audible user inputs to the processor and audible outputs from the processor to a user, the apparatus comprising:

a contacts database comprising a first field that includes at least one substantially correctly spelled contact identifier, a corresponding second field that includes at least one phonetic spelling of the contact identifier in the first field, and a data extension field, the data extension field indicative of whether the contact identifier is voice accessible;

a voice recognizer configured at least partially within the processor to directly access the first and second fields in the contacts database to interpret audible user inputs only if the data extension field indicates that the contact identifier is voice accessible; and the processor operating to allow a user to manually select the phonetic spelling of the contact identifier and manually select the data extension field to indicate whether the contact identifier is accessible by the voice recognizer.

24. The apparatus as recited in claim 23, wherein the contacts database further comprises an extension number field that corresponds to at least one of the first and second fields.

25. The apparatus as recited in claim 23, wherein the contacts database further comprises an alias field that corresponds to at least one of the first and second fields.

26. The arrangement as recited in claim 25, wherein the voice recognizer comprises an automatic speech recognition (ASR) engine that is configured to analyze the audible user inputs and match the audible user inputs to at least one of the first field, the second field, and the alias field to facilitate the placing of a call to a contact associated with the contact identifier.

27. The apparatus as recited in claim 23, wherein the voice recognizer further comprises an automatic speech recognition (ASR) engine that is configured to analyze the audible user inputs and in response to access at least one of the first and second fields in the contacts database.

28. The apparatus as recited in claim 23, wherein the voice recognizer further comprises a text-to-speech (TTS) engine that is configured to generate speech outputs suitable for outputting to the user from at least one of the first and second fields in the contacts database.

29. A method for supporting name dialing in a communications system, the method comprising:

receiving audible user inputs;

establishing a contacts database comprising a first field that includes at least one substantially correctly spelled contact identifier, a corresponding second field that includes at least one phonetic spelling of the contact identifier in the first field, and a data extension field, the data extension field indicative of whether the contact identifier is voice accessible;

directly accessing, by a voice recognizer, the first and second fields in the contacts database to interpret audible user inputs only if the data extension field indicates that the contact identifier is voice accessible;

allowing a user to manually select the phonetic spelling of the contact identifier and manually select the manually select the data extension field to indicate whether the contact identifier is accessible by the voice recognizer.

30. The method of claim 29, wherein the contacts database further comprises an extension number field that corresponds to at least one of the first and second fields.

31. The method of claim 29, wherein the contacts database further comprises an alias field that corresponds to at least one of the first and second fields.

32. The method of claim 31, wherein the voice recognizer comprises an automatic speech recognition (ASR) engine that is configured to analyze the audible user inputs and match the audible user inputs to at least one of the first field, the second field, and the alias field to facilitate the placing of a call to a contact associated with the contact identifier.

33. The method of claim 29, wherein the voice recognizer further comprises an automatic speech recognition (ASR) engine that is configured to analyze the audible user inputs, and in response to access at least one of the first and second fields in the contacts database.

34. The method of claim 29, wherein the voice recognizer further comprises a text-to-speech (TTS) engine that is configured to generate speech outputs suitable for outputting to the user from at least one of the first and second fields in the contacts database.

* * * * *